US010221765B2

(12) United States Patent
Alstad et al.

(10) Patent No.: US 10,221,765 B2
(45) Date of Patent: Mar. 5, 2019

(54) ANTI-ICING EXHAUST SYSTEM

(71) Applicant: HONEYWELL INTERNATIONAL INC., Morris Plains, NJ (US)

(72) Inventors: Shawn Alstad, Phoenix, AZ (US); Morris Anderson, Mesa, AZ (US); Danis Burton Smith, Chandler, AZ (US); Laurence David Noble Liston, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 265 days.

(21) Appl. No.: 15/248,150

(22) Filed: Aug. 26, 2016

(65) Prior Publication Data

US 2018/0058322 A1 Mar. 1, 2018

(51) Int. Cl.
*F02C 7/04* (2006.01)
*F02C 7/047* (2006.01)
(Continued)

(52) U.S. Cl.
CPC .............. *F02C 7/047* (2013.01); *B64D 15/04* (2013.01); *F02C 7/045* (2013.01);
(Continued)

(58) Field of Classification Search
CPC . F02C 7/047; F02C 7/045; F02C 7/04; B64D 15/04; B64D 15/02; B64D 15/06;
(Continued)

(56) References Cited

U.S. PATENT DOCUMENTS

| 5,011,098 A | * | 4/1991 | McLaren | ............... B64D 15/04 244/134 B |
| 5,088,277 A | | 2/1992 | Schulze | |

(Continued)

FOREIGN PATENT DOCUMENTS

| EP | 0536089 A1 | 4/1993 |
| GB | 986878 A | 3/1965 |

(Continued)

OTHER PUBLICATIONS

Extended EP Search Report for Application No. 17185397.1-1007 dated Jan. 29, 2018.

*Primary Examiner* — Steven Sutherland
(74) *Attorney, Agent, or Firm* — Lorenz & Kopf, LLP

(57) ABSTRACT

An anti-icing exhaust system for an inlet of a gas turbine engine is provided. The system includes a first housing portion that at least partially defines a chamber to receive an anti-icing fluid and includes a projection. A second housing portion includes a leading edge. The system includes a support structure that couples the first housing portion to the second housing portion such that the projection of the first housing portion is spaced apart from the leading edge of the second housing portion to define a gap. The gap is in fluid communication with a manifold. The support structure defines at least one flow passage in fluid communication with the chamber and the manifold to exhaust the fluid. The system includes an insulation strip having a first end received in the gap and coupled to the leading edge; and a second end coupled to the second housing portion.

20 Claims, 14 Drawing Sheets

(51) Int. Cl.
*F02C 7/045* (2006.01)
*B64D 15/04* (2006.01)
*B64D 33/02* (2006.01)

(52) U.S. Cl.
CPC .. *B64D 2033/0233* (2013.01); *F05D 2220/32* (2013.01); *F05D 2250/52* (2013.01); *F05D 2260/30* (2013.01); *F05D 2260/31* (2013.01); *F05D 2260/95* (2013.01)

(58) Field of Classification Search
CPC ................. B64D 15/08; B64D 15/10; B64D 2033/0233; F05D 2260/30
See application file for complete search history.

(56) References Cited

U.S. PATENT DOCUMENTS

| | | |
|---|---|---|
| 5,257,498 A | 11/1993 | Nikkanen et al. |
| 6,848,656 B2 * | 2/2005 | Linton ................... B64D 15/04 244/134 C |
| 8,061,657 B2 | 11/2011 | Rocklin et al. |
| 8,434,724 B2 | 5/2013 | Chelin et al. |
| 8,602,360 B2 | 12/2013 | Porte et al. |
| 9,777,632 B2 * | 10/2017 | Prather ................... F01D 25/02 |
| 2009/0108134 A1 * | 4/2009 | Thodiyil ................ B64D 15/04 244/134 B |
| 2012/0048389 A1 | 3/2012 | Chelin et al. |
| 2013/0224000 A1 | 8/2013 | Porte et al. |
| 2016/0108754 A1 * | 4/2016 | Herbaut ................ B64D 15/12 415/121.3 |

FOREIGN PATENT DOCUMENTS

| | | |
|---|---|---|
| WO | 9513467 A1 | 5/1995 |
| WO | 2016005711 A1 | 1/2016 |

\* cited by examiner

ANTI-ICING EXHAUST SYSTEM

TECHNICAL FIELD

The present disclosure generally relates to gas turbine engines, and more particularly relates to an anti-icing exhaust system for an inlet of a gas turbine engine.

BACKGROUND

Gas turbine engines may be employed to power various devices. For example, a gas turbine engine may be employed to power a mobile platform, such as an aircraft. In the example of an aircraft, the gas turbine engine may be operated in various types of weather and environmental conditions. For example, the gas turbine engine may be operated in cold weather, in which ice may form on exposed portions of the gas turbine engine, such as the inlet. Generally, in order to inhibit ice formation, an anti-icing system may be employed with the gas turbine engine. For example, the anti-icing system can circulate heated fluid, such as air, about the inlet of the gas turbine engine to inhibit ice formation and to evaporate water. In some instances, the heated fluid is supplied over a period of time, and needs to be exhausted from the inlet of the gas turbine engine.

Accordingly, it is desirable to provide an anti-icing exhaust system. Furthermore, other desirable features and characteristics of the present invention will become apparent from the subsequent detailed description and the appended claims, taken in conjunction with the accompanying drawings and the foregoing technical field and background.

SUMMARY

According to the various teachings of the present disclosure, an anti-icing exhaust system for an inlet of a gas turbine engine is provided. The anti-icing exhaust system includes a first housing portion associated with the inlet. The first housing portion at least partially defines a chamber to receive an anti-icing fluid from a source and includes a projection. The anti-icing exhaust system includes a second housing portion associated with the inlet, and the second housing portion includes a leading edge. The anti-icing exhaust system includes a support structure that couples the first housing portion to the second housing portion such that the projection of the first housing portion is spaced apart from the leading edge of the second housing portion to define a gap between the first housing portion and the second housing portion. The gap is in fluid communication with a manifold defined between the projection of the first housing portion and the support structure. The support structure defines at least one flow passage in fluid communication with the chamber and the manifold to exhaust the anti-icing fluid from the chamber through the manifold and the gap. The anti-icing exhaust system includes an insulation strip having a first end and a second end. The first end is received in the gap and coupled to the leading edge. The second end is coupled to the second housing portion.

Also provided is an anti-icing exhaust system for an inlet of a gas turbine engine. The anti-icing exhaust system includes an inlet lip at least partially defining a chamber to receive an anti-icing fluid from a source associated with the gas turbine engine and including a projection. The anti-icing exhaust system also includes an outer barrel having a leading edge. The anti-icing exhaust system includes a support structure that couples the inlet lip to the outer barrel such that the projection of the inlet lip is spaced apart from the leading edge of the outer barrel to define a gap between the inlet lip and the outer barrel. The gap is in fluid communication with a manifold defined between the projection of the inlet lip and the support structure. The support structure defines at least one flow passage in fluid communication with the chamber and the manifold to exhaust the anti-icing fluid from the chamber through the manifold and the gap in a substantially radial direction. The projection of the inlet lip extends over the at least one flow passage. The anti-icing exhaust system includes an insulation strip having a first end and a second end. The first end is received in the gap and coupled to the leading edge to protect the leading edge from the anti-icing fluid and the second end is coupled to the outer barrel.

Further provided is an anti-icing exhaust system for an inlet of a gas turbine engine. The anti-icing exhaust system includes an inlet lip at least partially defining a chamber to receive an anti-icing fluid from a source associated with the gas turbine engine and including a projection. The anti-icing exhaust system also includes an outer barrel having a leading edge. The anti-icing exhaust system includes a support structure having a first end coupled to the inlet lip, a second end coupled to the outer barrel and an intermediate body portion that spaces the projection of the inlet lip apart from the leading edge of the outer barrel to define a gap between the inlet lip and the outer barrel. The gap is in fluid communication with a manifold defined between the projection of the inlet lip and the support structure. The intermediate body portion defines a plurality of flow passages in fluid communication with the chamber and the manifold to exhaust the anti-icing fluid from the chamber through the manifold and the gap in a substantially radial direction. The anti-icing exhaust system includes an insulation strip having a first end and a second end. The first end is received in the gap and coupled to the leading edge to protect the leading edge from the anti-icing fluid and the second end is coupled to the outer barrel.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of engine that would benefit from an anti-icing exhaust system, and that the gas turbine engine described herein is merely one exemplary embodiment according to the present disclosure. Moreover, while the anti-icing exhaust system is described herein as being used with a gas turbine engine onboard a mobile platform or vehicle, such as a bus, motorcycle, train, motor vehicle, marine vessel, aircraft, rotorcraft and the like, the various teachings of the present disclosure can be used with a gas turbine engine associated with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

Figure 1:
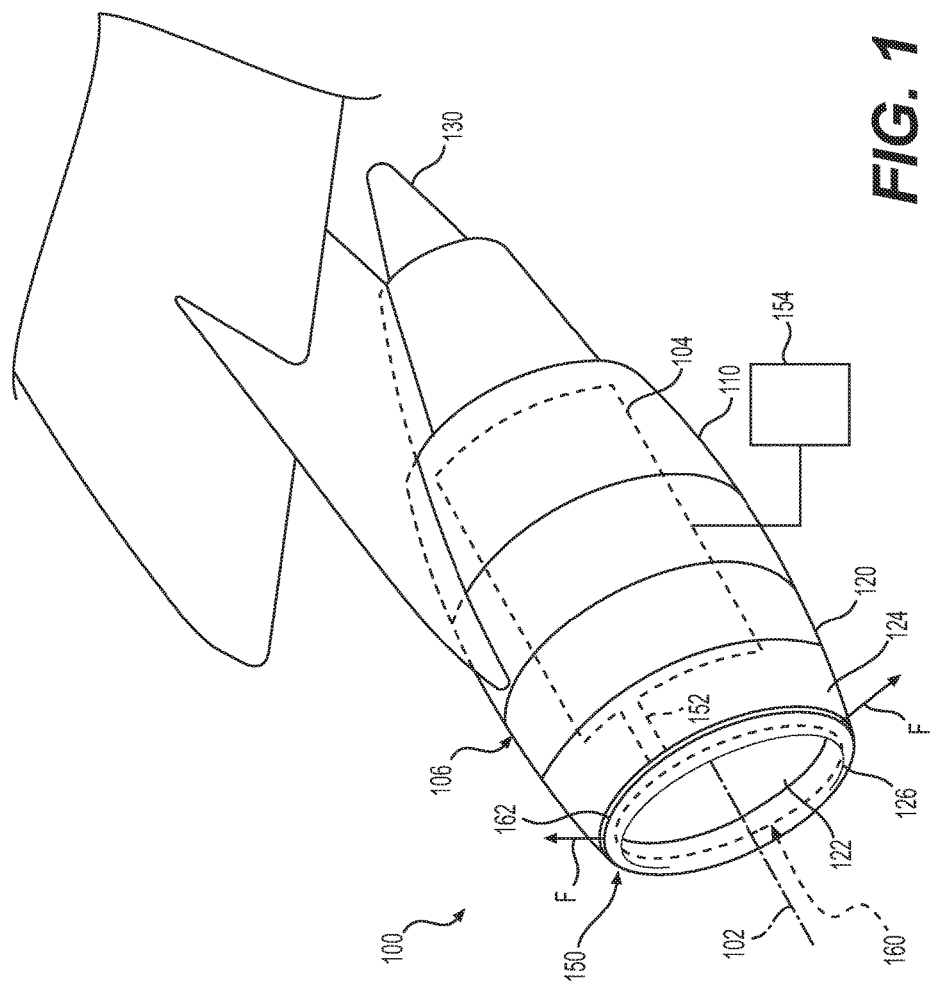
FIG. 1 is a partial schematic representation of an engine assembly, which includes an anti-icing exhaust system in accordance with various embodiments.

With reference to FIG. 1, FIG. 1 is a partial schematic representation of an engine assembly 100 in accordance with an exemplary embodiment. As shown, the engine assembly 100 is generally mounted on an aircraft, such as on an aircraft wing or on an aircraft fuselage. In certain embodiments, however, the engine assembly 100 can be mounted on a land or marine based vehicle, and moreover, the engine assembly 100 can be used in a stationary application. In the description below, the engine assembly 100 may be described with respect to an annular or cylindrical coordinate system with radial, axial, and tangential orientations relative to a centerline 102. However, it is noted that aspects of the engine or the overall engine assembly 100 may not be axisymmetric.

The engine assembly 100 includes an engine, such as a gas turbine engine 104 (schematically shown), housed in a nacelle 106. The nacelle 106 has an annular shape and may be formed by a number of sections or components, including a cowl section 110, an inlet cowl section 120, and an exhaust cowl section 130. The inlet cowl section 120 may include an inner barrel 122, an outer barrel 124, and an inlet lip 126. The outer barrel 124 circumscribes the inner barrel 122, and the inlet lip 126 joins the inner barrel 122 to the outer barrel 124 to form the leading edge of the engine assembly 100. In the following discussion, the inlet lip 126 comprises a first housing portion, and the outer barrel 124 comprises a second housing portion. Generally, the inlet cowl section 120 defines an inlet opening for directing air into the gas turbine engine 104. At least a portion of the air entering the engine assembly 100 is combusted by the gas turbine engine 104 to convert a portion of the energy from the fuel to rotational energy, causing a turbine of the gas turbine engine 104 to rotate, which forces air through the gas turbine engine 104. The resulting products are forcibly exhausted through an exhaust opening(s) at least partially defined by the exhaust cowl section 130. The force associated with this exhausted gas is called thrust.

As shown, the inlet lip 126 is the leading edge of the engine assembly 100. During some weather or operating conditions, ice may form on the inlet lip 126. As such, an anti-icing system 150 may be incorporated into the engine assembly 100 to prevent formation of ice or to remove formed ice (collectively referenced below as "anti-icing") from the inlet lip 126. As will be discussed, the anti-icing system 150 generally supplies a heated high pressure fluid or anti-icing fluid F, such as heated air, to the inlet lip 126. An anti-icing exhaust system 160 incorporated into the engine assembly 100 cooperates with the inlet lip 126 and the outer barrel 124 to exhaust the anti-icing fluid F received from the anti-icing system 150 into the atmosphere.

As will be described in greater detail below, the anti-icing system 150 circulates anti-icing fluid F in a manner that increases the temperature of portions of the inlet lip 126 that may otherwise be susceptible to icing. The anti-icing fluid F may be provided to the anti-icing system 150 from the gas turbine engine 104 via a conduit 152, typically as bleed air from a particular stage of a compressor in the gas turbine engine 104. In one exemplary embodiment, operation of the anti-icing system 150 may be controlled by a controller 154 based on weather conditions, operating conditions, and/or operator commands as a stand-alone system or as part of a larger aircraft safety system. Although not shown, other components, such as flow valves and conduits, may also be incorporated into the engine assembly 100 to facilitate efficient and effective operation of the anti-icing system 150. As the anti-icing fluid F may be supplied to the inlet lip 126 over a period of time to ensure that the inlet lip 126 reaches or is maintained at a sufficient temperature, the anti-icing fluid F generally needs to be exhausted from the inlet lip 126. The anti-icing exhaust system 160 directs the anti-icing fluid F through a gap 162 defined between the inlet lip 126 and the outer barrel 124 into an ambient environment surrounding the engine assembly 100. By exhausting the anti-icing fluid F through the gap 162, an external exhaust tube is not required, thereby providing an aesthetically appealing look for the nacelle 106.

Figure 2:
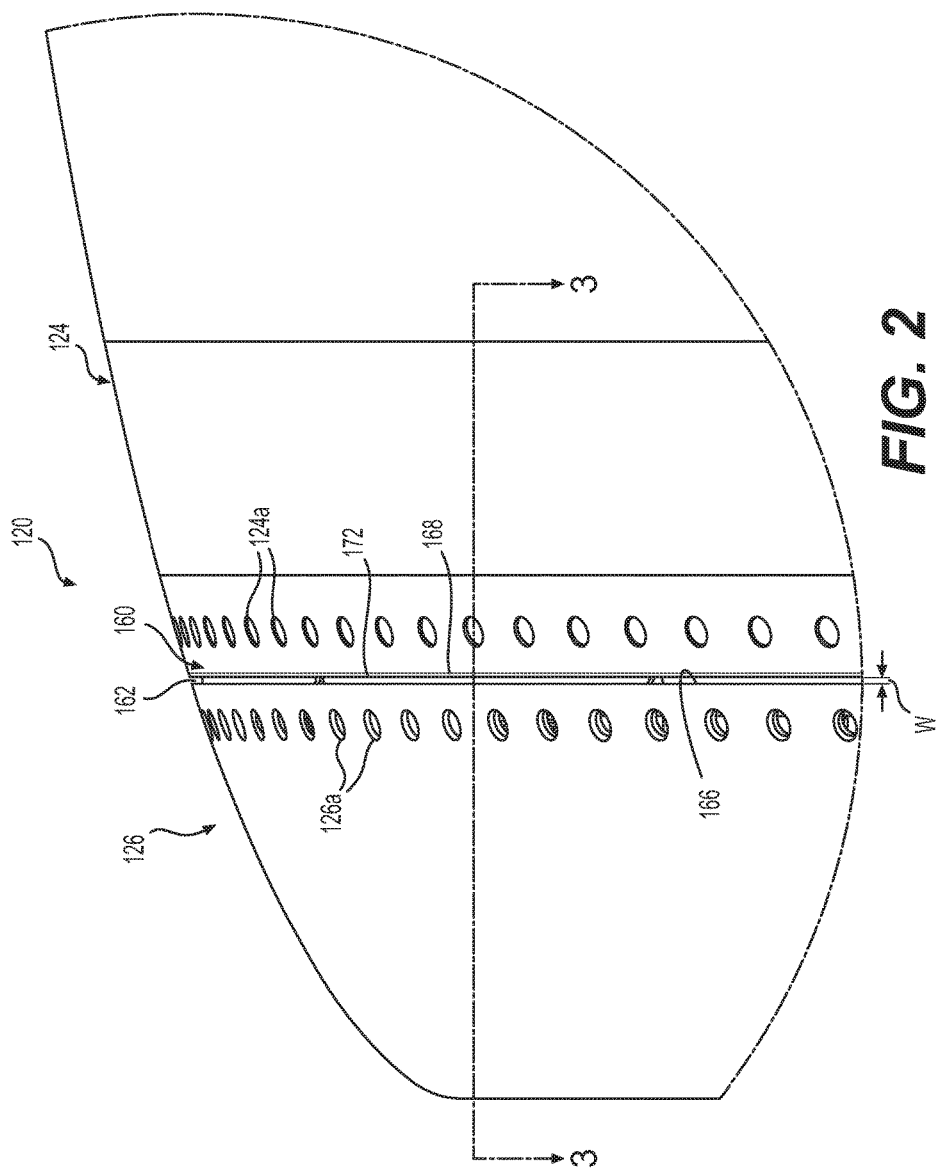
FIG. 2 is a detail view of a portion of an inlet cowl section of the engine assembly of FIG. 1, which includes an anti-icing exhaust system in accordance with one exemplary embodiment.

With reference to FIG. 2, a portion of the inlet lip 126 and the outer barrel 124 are shown in greater detail. The gap 162 is defined between a projection 166 of the inlet lip 126 and a portion of the anti-icing exhaust system 160 coupled to the outer barrel 124. The gap 162 has a width W, which is greater than zero, and can range from about 0.030 inches (0.0762 centimeters) to about 0.250 inches (0.635 centimeters). The gap 162 is generally defined such that the gap 162 extends substantially about the perimeter or circumference of the inlet lip 126 (FIG. 1). It should be noted that while the gap 162 is described and illustrated herein as extending substantially completely about the perimeter or circumference of the inlet lip 126, in certain embodiments, the gap 162 may not extend completely about the circumference of the inlet lip 126. For example, in certain embodiments, one or more sections of the projection 166 of the inlet lip 126 and/or the portion of the anti-icing exhaust system 160 coupled to the outer barrel 124 may be coupled together such that the gap 162 does not exist at all in certain areas or does not define a flow path for the anti-icing fluid F to exit those one or more sections of the anti-icing exhaust system 160. For example, the gap 162 may not be defined adjacent to selected areas of composites, paints, or other heat sensitive surfaces, as desired.

Figure 3:
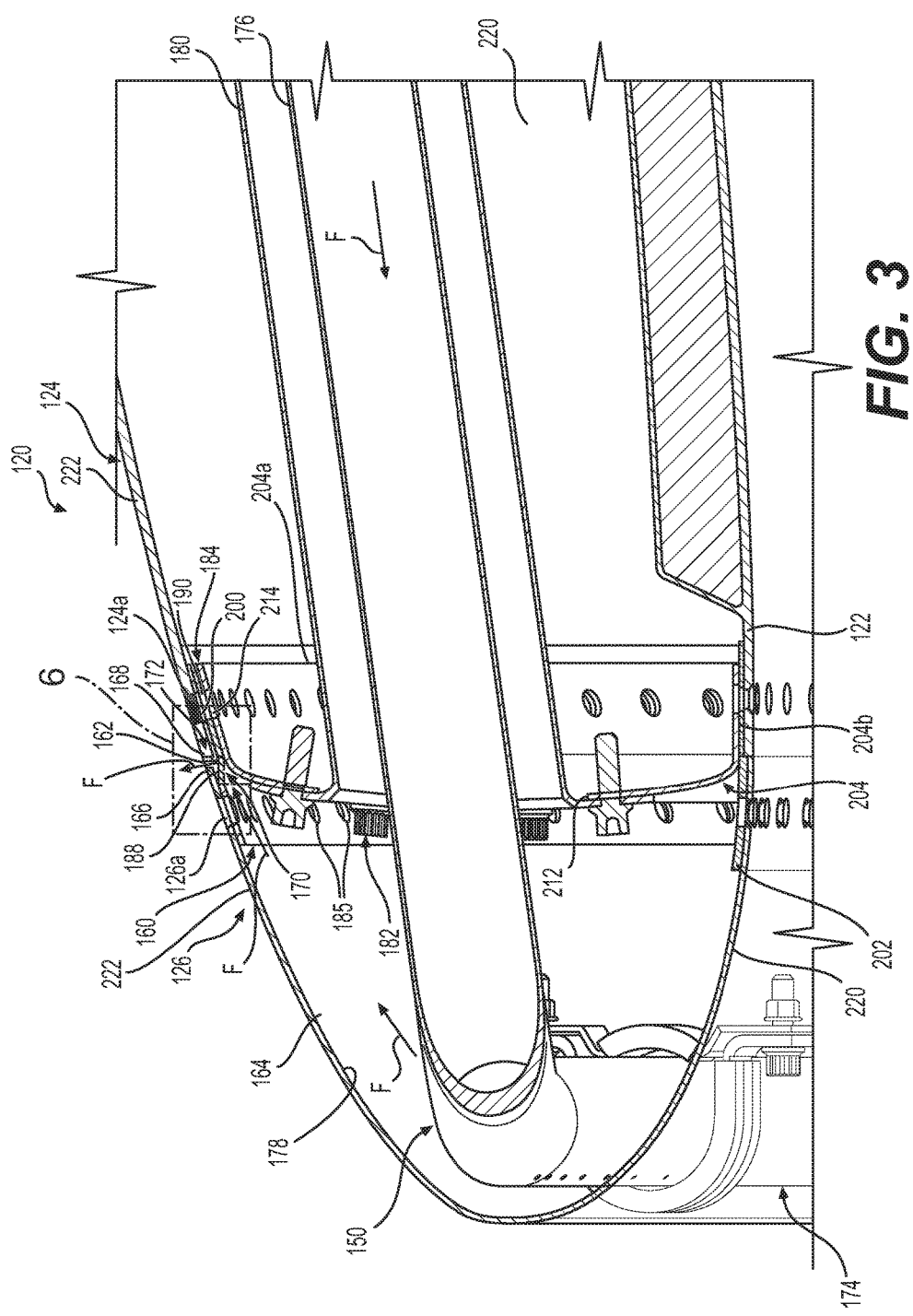
FIG. 3 is a cross-sectional view of the portion of the inlet cowl section including the anti-icing exhaust system of FIG. 2, taken along line 3-3 of FIG. 2.

With reference to FIG. 3, the inlet lip 126 at least partially defines a chamber 164 that receives the anti-icing fluid F from the anti-icing system 150. In one example, the inlet lip 126 has a substantially U-shaped cross-section, which at least partially defines the chamber 164. The inlet lip 126 also includes the projection 166, which extends in a direction towards the outer barrel 124. The projection 166 extends about the perimeter of the inlet lip 126 and cooperates with the outer barrel 124 to define the gap 162. The outer barrel 124 includes a leading edge 168, which is defined along a perimeter of the outer barrel 124 adjacent to the gap 162. Each of the inlet lip 126 and the outer barrel 124 define a respective plurality of coupling bores 126a, 124a through the respective one of the inlet lip 126 and the outer barrel 124, which are spaced apart about a perimeter of the respective inlet lip 126 and the outer barrel 124. The plurality of coupling bores 126a are generally defined adjacent to the projection 166, and the plurality of coupling bores 124a are generally defined adjacent to the leading edge 168. The plurality of coupling bores 126a, 124a receive a plurality of mechanical fasteners, such as bolts, screws, etc., to couple the anti-icing exhaust system 160 to the inlet lip 126 and the outer barrel 124. For ease of illustration, the plurality of mechanical fasteners is omitted from the drawings. In this example, the inlet lip 126 is generally composed of a metal or metal alloy, while the outer barrel 124 is composed of a polymeric or composite material.

Figure 4:
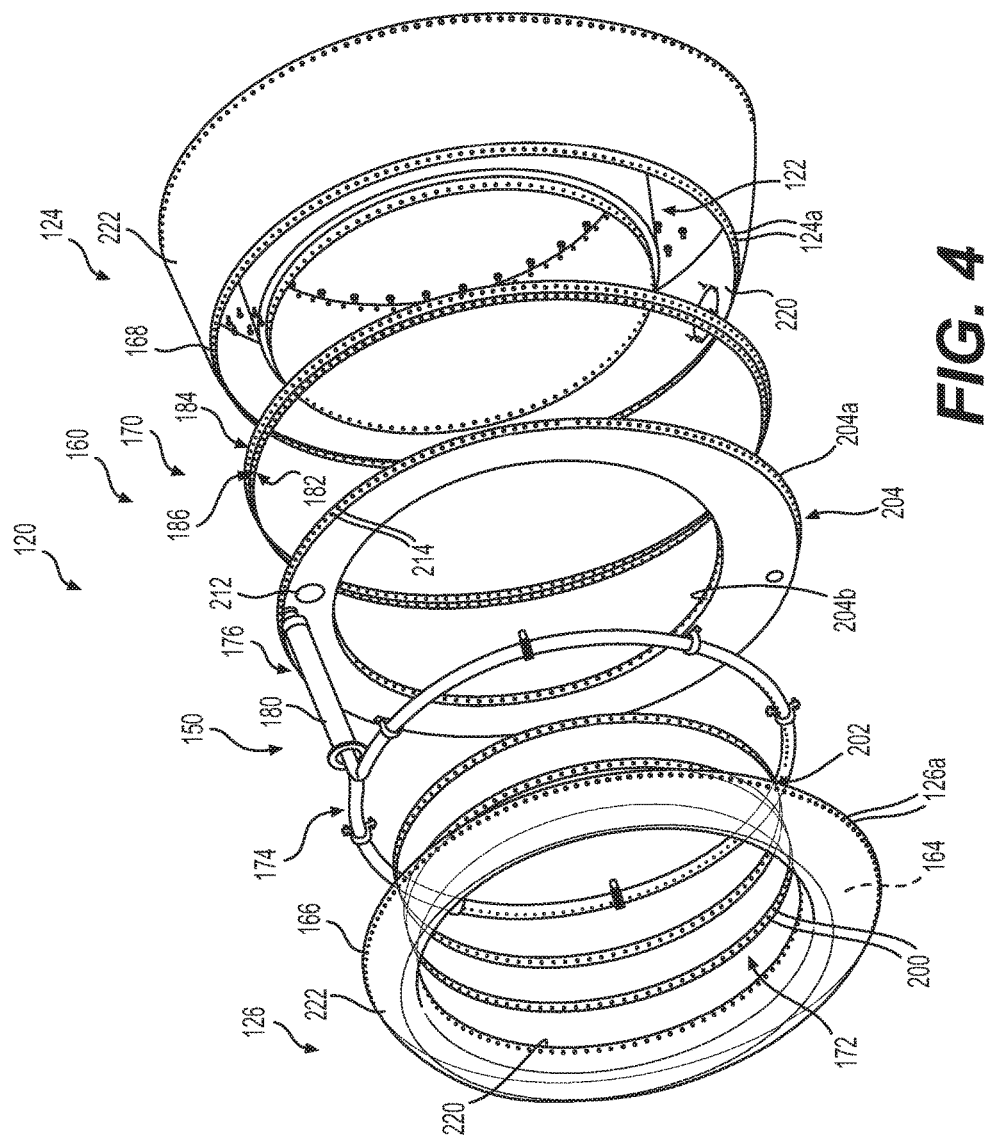
FIG. 4 is an exploded view of the inlet cowl section of FIG. 2, which includes the anti-icing exhaust system of FIG. 2.

With reference to FIG. 4, the inlet cowl section 120, including the anti-icing exhaust system 160 and the anti-icing system 150, are shown in greater detail. In this example, the anti-icing exhaust system 160 includes a support structure 170 and an insulation strip 172, and the anti-icing system 150 includes a piccolo tube 174 and a piccolo tube inlet 176. The piccolo tube 174 is annular, and has a circumference sized and shaped to be received in the chamber 164 partially defined by the inlet lip 126. Generally, the piccolo tube 174 is a hollow tube, which is in fluid communication with the piccolo tube inlet 176 to receive the pressurized anti-icing fluid F from the gas turbine engine 104. The piccolo tube 174 includes a plurality of perforations, which enable the received pressurized anti-icing fluid F from the gas turbine engine 104 to be directed out of the piccolo tube 174 onto an inner surface or inner skin 178 (FIG. 3) of the inlet lip 126 to melt or evaporate ice or water. The piccolo tube inlet 176 is coupled to a source of pressurized anti-icing fluid F associated with the gas turbine engine 104 to receive the pressurized anti-icing fluid F to heat the inner skin 178. For example, the piccolo tube inlet 176 is coupled to a bypass conduit associated with a compressor or other component of the gas turbine engine 104. The piccolo tube inlet 176 receives the anti-icing fluid F from the gas turbine engine 104 and directs the anti-icing fluid F into the piccolo tube 174. In certain embodiments, the piccolo tube inlet 176 is integrally formed with the piccolo tube 174. The piccolo tube inlet 176 can also include a heat shield 180 over at least a portion of the piccolo tube inlet 176 to insulate the outer barrel 124 from the anti-icing fluid F (FIG. 3). It should be noted that the use of a piccolo tube 174 based anti-icing system 150 is merely exemplary, as any suitable anti-icing system can be employed within the chamber 164 to heat the inlet lip 126 to inhibit ice formation, such as a swirl anti-icing system.

Figure 5:
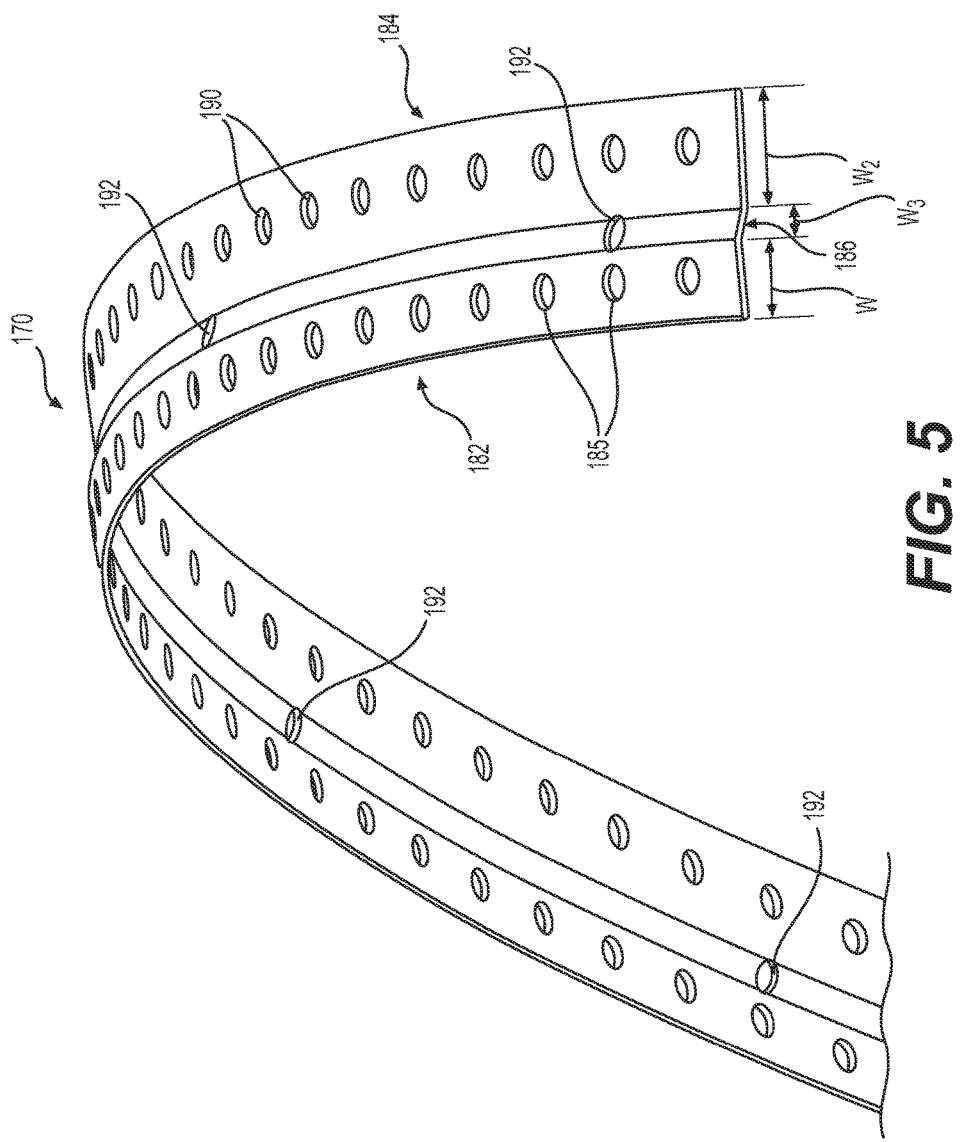
FIG. 5 is a detail perspective view of a portion of a support structure of the anti-icing exhaust system of FIG. 2.

The anti-icing exhaust system 160 includes the support structure 170 and the insulation strip 172. The support structure 170 couples the first housing portion or the inlet lip 126 to the second housing portion or the outer barrel 124 such that the projection 166 of the inlet lip 126 is spaced apart from the leading edge 168 of the outer barrel 124 to define the gap 162 between the inlet lip 126 and the outer barrel 124. The support structure 170 is annular, and has a first end 182 and a second end 184. The first end 182 and the second end 184 are interconnected by an intermediate body portion 186. Generally, the support structure 170 is integrally formed of a metal or metal alloy, via stamping, casting, selective laser sintering, etc. It will be understood, however, that one or more of the first end 182, the second end 184 or the intermediate body portion 186 may be separately formed and coupled to form the support structure 170 through welding, etc. With reference to FIG. 5, the support structure 170 is shown in greater detail. In this example, the first end 182 has a width W that is different than, and generally less than, a width W2 of the second end 184. The projection 166, the insulation strip 172 and the intermediate body portion 186 cooperate to define a manifold 188 (FIG. 3) for the exhaust of the anti-icing fluid F through the gap 162.

The first end 182 includes a first plurality of bores 185 defined through the first end 182, which are spaced apart about a perimeter or circumference of the first end 182. The first plurality of bores 185 are coaxially aligned with the plurality of coupling bores 126a of the inlet lip 126 (FIG. 3) to receive the plurality of mechanical fasteners, such as bolts, screws, rivets, etc. (not shown) to couple the inlet lip 126 to the first end 182 of the support structure 170. The second end 184 includes a second plurality of bores 190 defined through the second end 184, which are spaced apart about a perimeter or circumference of the second end 184. The second plurality of bores 190 are coaxially aligned with the plurality of coupling bores 124a of the outer barrel 124 (FIG. 3) to receive the plurality of mechanical fasteners, such as bolts, screws, rivets, etc. (not shown) to couple the outer barrel 124 to the second end 184 of the support structure 170.

The intermediate body portion 186 is defined between the first end 182 and the second end 184. In this example, with reference to FIG. 6, the intermediate body portion 186 extends along an axis A, which is oblique or transverse to an axis A2 of the second end 184. Thus, the first end 182 is generally offset from the second end 184 via the intermediate body portion 186 such that the support structure 170 has a generally Z-shape in cross-section. A width W3 of the intermediate body portion 186 defines a width of the gap 162. Stated another way, the intermediate body portion 186 spans the gap 162.

The intermediate body portion 186 includes a plurality of flow passages 192, which are defined through the intermediate body portion 186 and are spaced apart about a perimeter or circumference of the intermediate body portion 186 (FIGS. 4 and 5). In one example, each of the plurality of flow passages 192 comprise a bore defined through the intermediate body portion 186, via drilling, stamping, etc. One or more of the plurality of flow passages 192 can include a countersink 192a, which can aid in directing the anti-icing fluid F through the respective plurality of flow passages 192 into the manifold 188. In one example, about 15 to about 40 flow passages 192 are defined through the intermediate body portion 186, and are spaced substantially evenly about the intermediate body portion 186. In this example, as each of the plurality of flow passages 192 are spaced substantially evenly about the intermediate body portion 186, and thus, substantially evenly about a perimeter or circumference of the support structure 170, and the gap 162 is defined to extend substantially continuously about the inlet cowl section 120, the plurality of flow passages 192 cooperate with the gap 162 to exhaust the anti-icing fluid F from the plurality of flow passages 192 about a circumference of the inlet cowl section 120. It should be noted that while the plurality of flow passages 192 are described and illustrated herein as being substantially evenly spaced about the intermediate body portion 186, the present disclosure is not so limited. In this regard, the plurality of flow passages 192 can be defined through the intermediate body portion 186 so as to be unevenly spaced about the perimeter of the intermediate body portion 186 to control an amount of the flow of the anti-icing fluid F into various portions of the manifold 188, and thus, to control the distribution of the exhaust of the anti-icing fluid F about the circumference of the inlet cowl section 120.

Each of the plurality of flow passages 192 are in fluid communication with the chamber 164 of the inlet lip 126 and the manifold 188 to exhaust the anti-icing fluid or anti-icing fluid F from the chamber 164 into the manifold 188, and thus, the gap 162 such that the anti-icing fluid flows from the chamber 164 through each of the plurality of flow passages 192, into the manifold 188 and exits the inlet cowl section 120 via the gap 162. The projection 166 of the inlet lip 126 extends over the plurality of flow passages 192 such that each of the plurality of flow passages 192 is hidden from an exterior view of the nacelle 106 of the gas turbine engine 104 by the projection 166 (FIG. 2). Stated another way, the projection 166 of the inlet lip 126 extends over the plurality of flow passages 192 such that the plurality of flow passages 192 are not visible from an exterior of the nacelle 106 of the gas turbine engine 104, thereby providing an aesthetically pleasing appearance for the inlet cowl section 120.

The insulation strip 172 cooperates with the intermediate body portion 186 of the support structure 170 and the projection 166 to define the manifold 188. The insulation strip 172 is generally integrally formed, and is formed from a metal or metal alloy, via stamping, casting, forging, additive manufacturing, etc. In one example, the insulation strip 172 is composed of titanium. The insulation strip 172 is coupled to the outer barrel 124, such that a portion of the insulation strip 172 substantially covers the leading edge 168 of the outer barrel 124 to protect the leading edge 168 from the anti-icing fluid F that flows out of the gap 162. It should be noted that the insulation strip 172 can be made in sections, via stamping, casting, forging, etc., and bonded together to form a continuous insulation strip 172, if desired. With reference to FIG. 4, the insulation strip 172 is annular, and is sized and shaped to surround the leading edge 168 of the outer barrel 124 about a perimeter of the leading edge 168.

Figure 6:
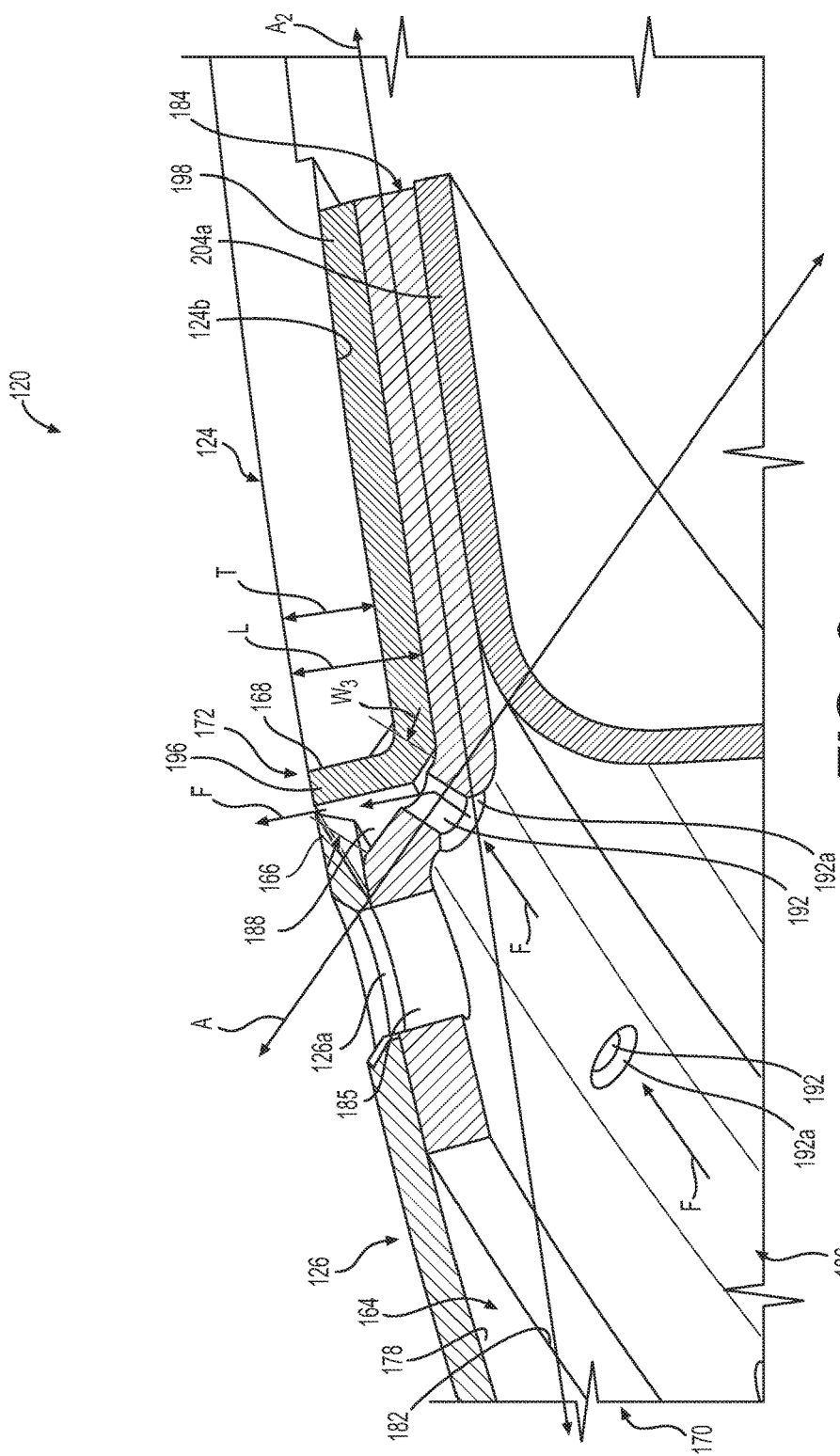
FIG. 6 is a detail view of FIG. 3, taken at 6 on FIG. 3, which includes the anti-icing exhaust system of FIG. 2.
Figure 7:
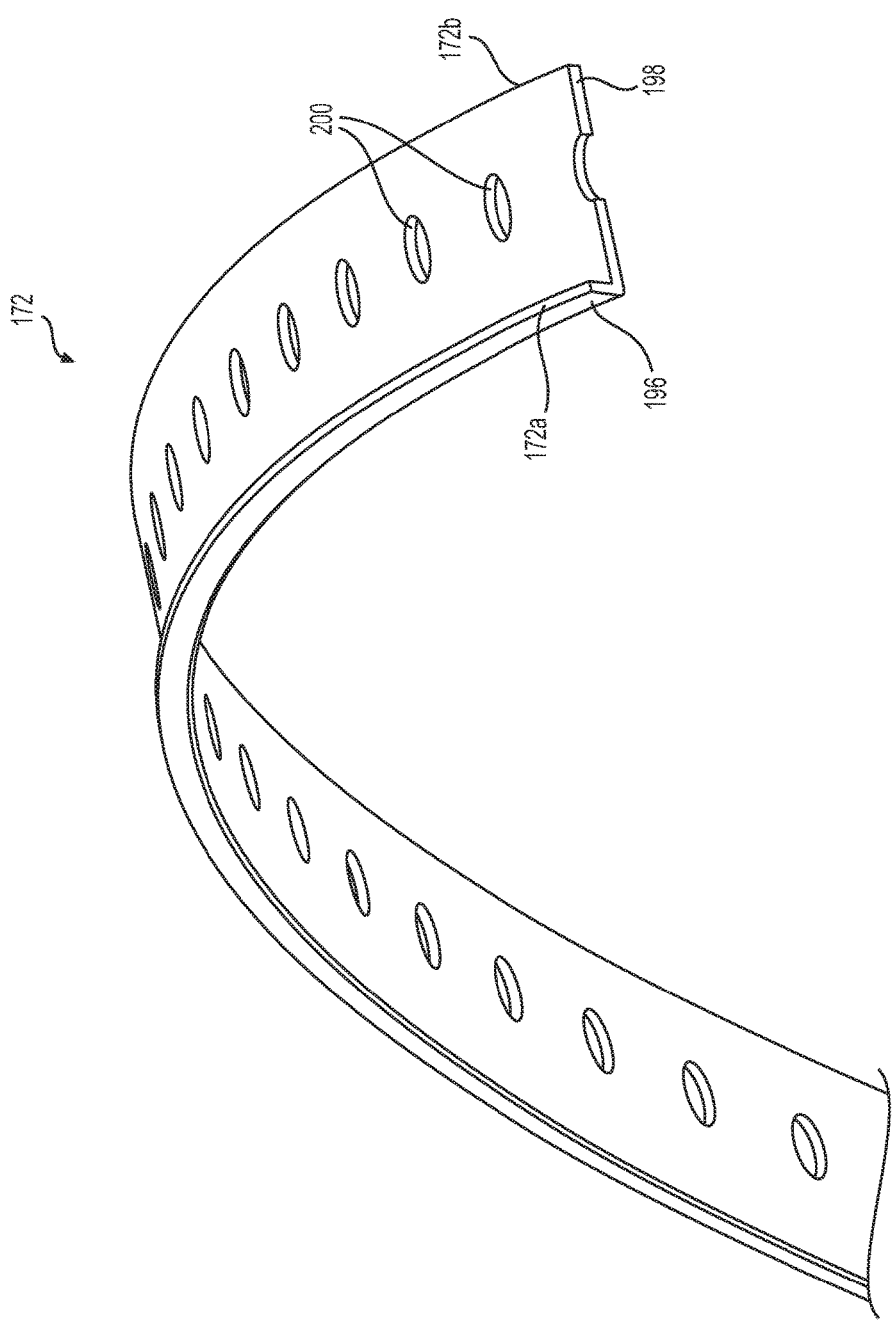
FIG. 7 is a detail perspective view of a portion of an insulation strip of the anti-icing exhaust system of FIG. 2.

With reference to FIG. 7, in one embodiment, the insulation strip 172 is generally L-shaped in cross-section, and includes a first end 172a and a second end 172b. The first end 172a includes a flange 196 and the second end 172b includes a body 198. The flange 196 extends upwardly from the body 198 at substantially a right angle, such that the flange 196 is substantially perpendicular to the body 198. The flange 196 is received in the gap 162, such that the first end 172a of the insulation strip 172 is received in the gap 162. With reference to FIG. 6, the flange 196 extends for a length L that is at least equal to, and in this example, greater than a thickness T of the leading edge 168 to protect the leading edge 168 from the anti-icing fluid F as the anti-icing fluid F is exhausted through the gap 162. Stated another way, the flange 196 is coupled to the leading edge 168 of the outer barrel 124 to insulate the leading edge 168 from the anti-icing fluid F, and also protects the leading edge 168 from erosion.

With reference back to FIG. 7, generally, the body 198 of the insulation strip 172 includes a plurality of holes 200, which couple the second end 184 of the support structure 170 and the insulation strip 172 to the outer barrel 124 via one or more mechanical fasteners (not shown) received through the plurality of holes 200. In certain embodiments, the body 198 of the insulation strip 172 is also bonded to an inner surface 124b of the outer barrel 124 (FIG. 3), via an adhesive. The plurality of holes 200 are defined through the body 198 of the insulation strip 172 so as to be spaced apart about the perimeter or circumference of the insulation strip 172. Thus, the second end 172b of the insulation strip 172 is coupled to the second housing portion or the outer barrel 124.

With reference to FIG. 4, the inlet cowl section 120 also includes a second insulation strip 202, a forward bulkhead 204 and the inner barrel 122. As the second insulation strip 202, the forward bulkhead 204 and the inner barrel 122 are generally conventional, the second insulation strip 202, the forward bulkhead 204 and the inner barrel 122 will not be discussed in great detail herein. Briefly, however, the second insulation strip 202 is annular, and is coupled to the inner barrel 122 to protect the inner barrel 122 from the anti-icing fluid F contained within the chamber 164 defined by the inlet lip 126.

The forward bulkhead 204 couples the inner barrel 122 to the outer barrel 124, and defines at least one opening 212 that receives the piccolo tube inlet 176 therethrough. The forward bulkhead 204 is coupled to the outer barrel 124 along an outer circumference 204a of the forward bulkhead 204, and the forward bulkhead 204 is coupled to the inner barrel 122 along an inner circumference 204b of the forward bulkhead 204. With reference to FIG. 3, the forward bulkhead 204 generally includes a plurality of bores 214 along the outer circumference 204a that are coaxially aligned with the second plurality of bores 190 of the support structure 170, the plurality of holes 200 of the insulation strip 172 and the plurality of coupling bores 124a of the outer barrel 124 to receive the plurality of mechanical fasteners (not shown) to couple the forward bulkhead 204 to the anti-icing exhaust system 160 and the outer barrel 124. The forward bulkhead 204 cooperates with the inlet lip 126 to define the chamber 164. With reference to FIG. 4, the inner barrel 122 forms a portion of an inner flow path for the gas turbine engine 104 (FIG. 1). The inner barrel 122 is coupled to the outer barrel 124 via the forward bulkhead 204.

In order to assemble the inlet cowl section 120, in one example, with reference to FIG. 4, with each of the inlet lip 126, the outer barrel 124, the support structure 170, the insulation strip 172, the piccolo tube 174, the piccolo tube inlet 176, the heat shield 180, the second insulation strip 202, the forward bulkhead 204 and the inner barrel 122 formed and/or manufactured, the heat shield 180 is positioned about the piccolo tube inlet 176 and the piccolo tube inlet 176 is coupled to the forward bulkhead 204 such that the heat shield 180 and the piccolo tube inlet 176 extend through the opening 212. The second insulation strip 202 can be coupled to the inner barrel 122, and the inner barrel 122 is coupled to the forward bulkhead 204. The insulation strip 172 is coupled to the outer barrel 124, and the second end 184 of the support structure 170 is coupled to the outer barrel 124. The forward bulkhead 204 is coupled to the second end 184, such that the one or more mechanical fasteners can be received through the plurality of coupling bores 124a, the plurality of holes 200, the second plurality of bores 190 and the plurality of bores 214 (FIG. 3) to couple the insulation strip 172, the second end 184 and the forward bulkhead 204 to the outer barrel 124. The first end 182 of the support structure 170 is coupled to the plurality of coupling bores 126a of the inlet lip 126 by one or more mechanical fasteners received through the coupling bores 126a and the first plurality of bores 185 to couple the inlet lip 126 to the support structure 170. Once the inlet lip 126 is coupled to the support structure 170, the intermediate body portion 186 defines the gap 162 between the projection 166 and the leading edge 168 (FIG. 3).

Once assembled, with reference to FIG. 3, high pressure anti-icing fluid F enters through the piccolo tube inlet 176 from the source associated with the gas turbine engine 104, and flows through the piccolo tube 174 before exiting the piccolo tube 174 via the plurality of perforations. The anti-icing fluid F heats the inner skin 178 within the chamber 164 defined by the inlet lip 126 and the forward bulkhead 204. Due to a pressure difference between the chamber 164 and the ambient environment surrounding the gas turbine engine 104, the anti-icing fluid F flows through the plurality of flow passages 192 and enters the manifold 188. The manifold 188 directs the anti-icing fluid to and through the gap 162, such that the anti-icing fluid F is exhausted through the gap 162 in a substantially radial direction into the ambient environment surrounding the gas turbine engine 104. Stated another way, with reference to FIG. 1, the anti-icing fluid F exits through the gap 162 in substantially the radial direction, relative to the centerline 102 defined by the gas turbine engine 104. In other words, the gap 162 is defined to exhaust the anti-icing fluid F in a direction, which is substantially perpendicular to the centerline 102 of the gas turbine engine 104. As shown in FIG. 4, the inlet lip 126 and the outer barrel 124 have an inboard side 220 that is adjacent to the flow path for air into the gas turbine engine 104, and an outboard side 222, which defines an exterior of the gas turbine engine 104. As shown in FIG. 3, the plurality of flow passages 192 cooperate with the gap 162 to exhaust the anti-icing fluid F along the outboard side of the outer barrel 124.

It will be understood that the anti-icing exhaust system 160 described with regard to FIGS. 1-7 is one exemplary embodiment for an anti-icing exhaust system for use with the inlet cowl section 120 of the engine assembly 100. In certain embodiments, with reference to FIG. 8, the inlet cowl section 120 of the engine assembly 100 includes an anti-icing exhaust system 300. As the anti-icing exhaust system 300 can be similar to the anti-icing exhaust system 160 described with regard to FIGS. 1-7, the same reference numerals will be used to denote the same or similar components. In this embodiment, the anti-icing exhaust system 300 includes a support structure 302 and the insulation strip 172.

Figure 9:
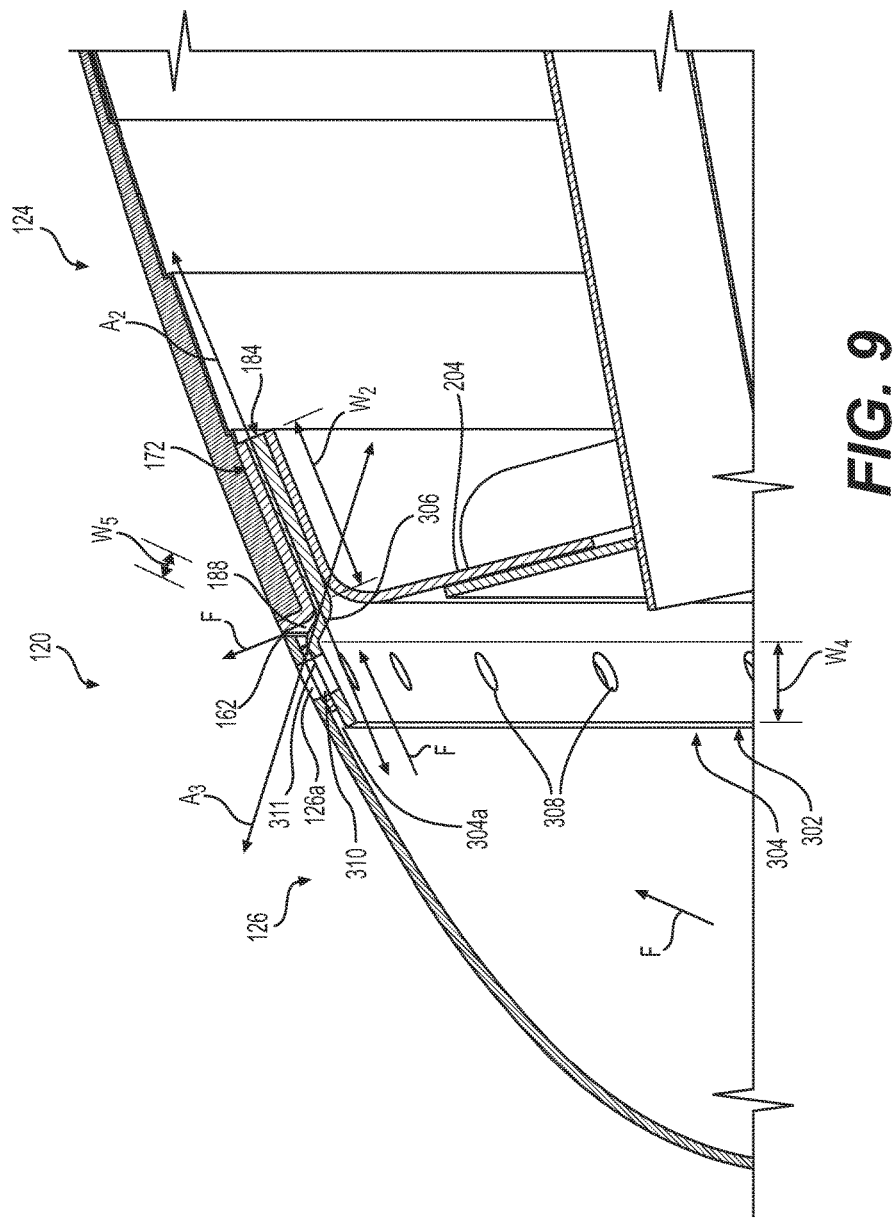
FIG. 9 is a cross-sectional view of the portion of the inlet cowl section including the anti-icing exhaust system of FIG. 8, taken along line 9-9 of FIG. 8.

The support structure 302 couples the first housing portion or the inlet lip 126 to the second housing portion or the outer barrel 124 such that the projection 166 of the inlet lip 126 is spaced apart from the leading edge 168 of the outer barrel 124 to define the gap 162 between the inlet lip 126 and the outer barrel 124. The support structure 302 is annular, and has a first end 304 and the second end 184. The first end 304 and the second end 184 are interconnected by an intermediate body portion 306. Generally, the support structure 302 is integrally formed of a metal or metal alloy, via stamping, casting, selective laser sintering, etc. It will be understood, however, that one or more of the first end 304, the second end 184 or the intermediate body portion 306 may be separately formed and coupled to form the support structure 302 through welding, etc. With reference to FIG. 9, the support structure 302 is shown in greater detail. In this example, the first end 304 has a width W4 that is different than, and generally, less than the width W2 of the second end 184. The projection 166, the insulation strip 172 and the intermediate body portion 306 cooperate to define the manifold 188 for the exhaust of the anti-icing fluid F through the gap 162.

Figure 8:
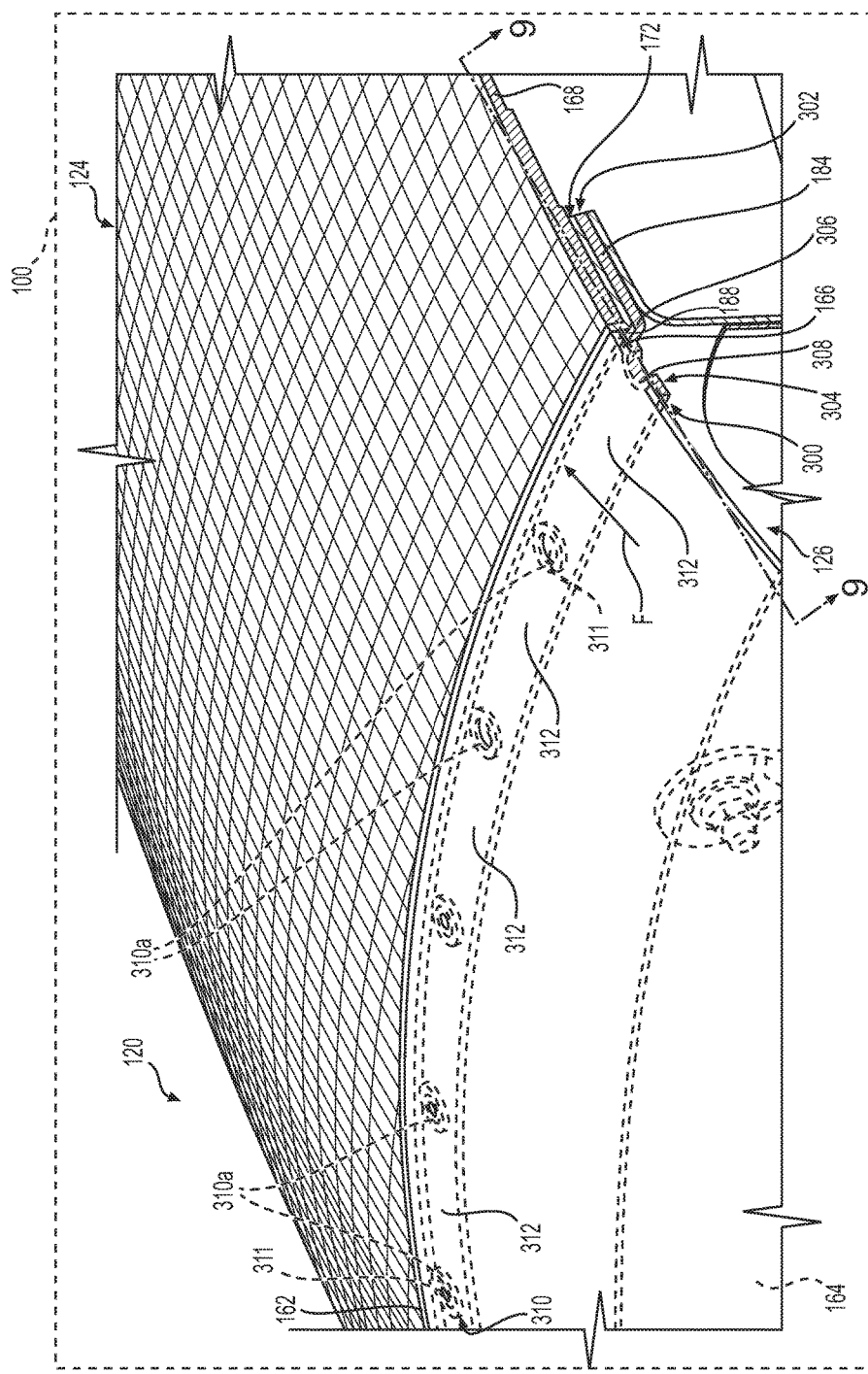
FIG. 8 is a detail view of a portion of an inlet cowl section of the engine assembly of FIG. 1, which includes an anti-icing exhaust system in accordance with one exemplary embodiment.

The first end 304 includes a first plurality of bores 308 defined through the first end 304, which are spaced apart about a perimeter or circumference of the first end 304. The first plurality of bores 308 are coaxially aligned with the plurality of coupling bores 126a of the inlet lip 126 to receive the plurality of mechanical fasteners, such as bolts, screws, rivets, etc. (not shown) to couple the inlet lip 126 to the first end 304 of the support structure 302. In this example, a plurality of spacers 310 are positioned about each of the first plurality of bores 308 so as to be positioned between the inner skin 178 of the inlet lip 126 and a surface 304a of the first end 304. By positioning the plurality of spacers 310 between the support structure 302 and the inner skin 178, a plurality of flow passages 312 are defined between adjacent ones of the plurality of spacers 310, as shown in FIG. 8. The plurality of flow passages 312 defined between adjacent ones of the plurality of spacers 310 directs the anti-icing fluid F from the chamber 164 to the manifold 188, and from the manifold 188, the anti-icing fluid F is exhausted through the gap 162.

In one example, about 15 to about 40 flow passages 312 are defined between the support structure 302 and the inlet lip 126, and are spaced substantially evenly about a perimeter or circumference of the support structure 302 and the gap 162. As each of the plurality of flow passages 312 are spaced substantially evenly about a perimeter or circumference of the support structure 302, and the gap 162 is defined to extend substantially continuously about the inlet cowl section 120, the plurality of flow passages 312 cooperate with the gap 162 to exhaust the anti-icing fluid from the plurality of flow passages 312 about a circumference of the inlet cowl section 120. Generally, the plurality of flow passages 312 cooperates with the gap 162 to exhaust the anti-icing fluid F along the outboard side 222. It should be noted that while the plurality of flow passages 312 are described and illustrated herein as being substantially evenly spaced between the support structure 302 and the inlet lip 126, the present disclosure is not so limited. In this regard, the plurality of flow passages 312 can be defined between the support structure 302 and the inlet lip 126 so as to be unevenly spaced about the perimeter of the support structure 302 to control an amount of the flow of the anti-icing fluid F into various portions of the manifold 188, and thus, to control the distribution of the exhaust of the anti-icing fluid F about the circumference of the inlet cowl section 120.

In the example of FIGS. 8 and 9, the plurality of spacers 310 comprise a plurality of washers 310a, which are coupled about each one of the first plurality of bores 308. Each of the washers 310a are formed of a metal or metal alloy, and define a bore 311 that is substantially coaxial with the respective bore of the first plurality of bores 308. Each of the plurality of washers 310a can be positioned between the inner skin 178 and the surface 304a of the first side 304 and coupled between the inner skin 178 and the first side 304 by the respective mechanical fastener, for example, bolt, screw, rivet etc., received through the first plurality of bores 308. Alternatively, each of the plurality of washers 310a can be integrally formed with the first end 304, via additive manufacturing, stamping, casting, etc. As a further alternative, each of the plurality of washers 310a can be coupled to the first end 304 via welding, adhesives, etc. In this example, each of the plurality of flow passages 312 are defined between adjacent ones of the plurality of washers 310a.

Figure 10:
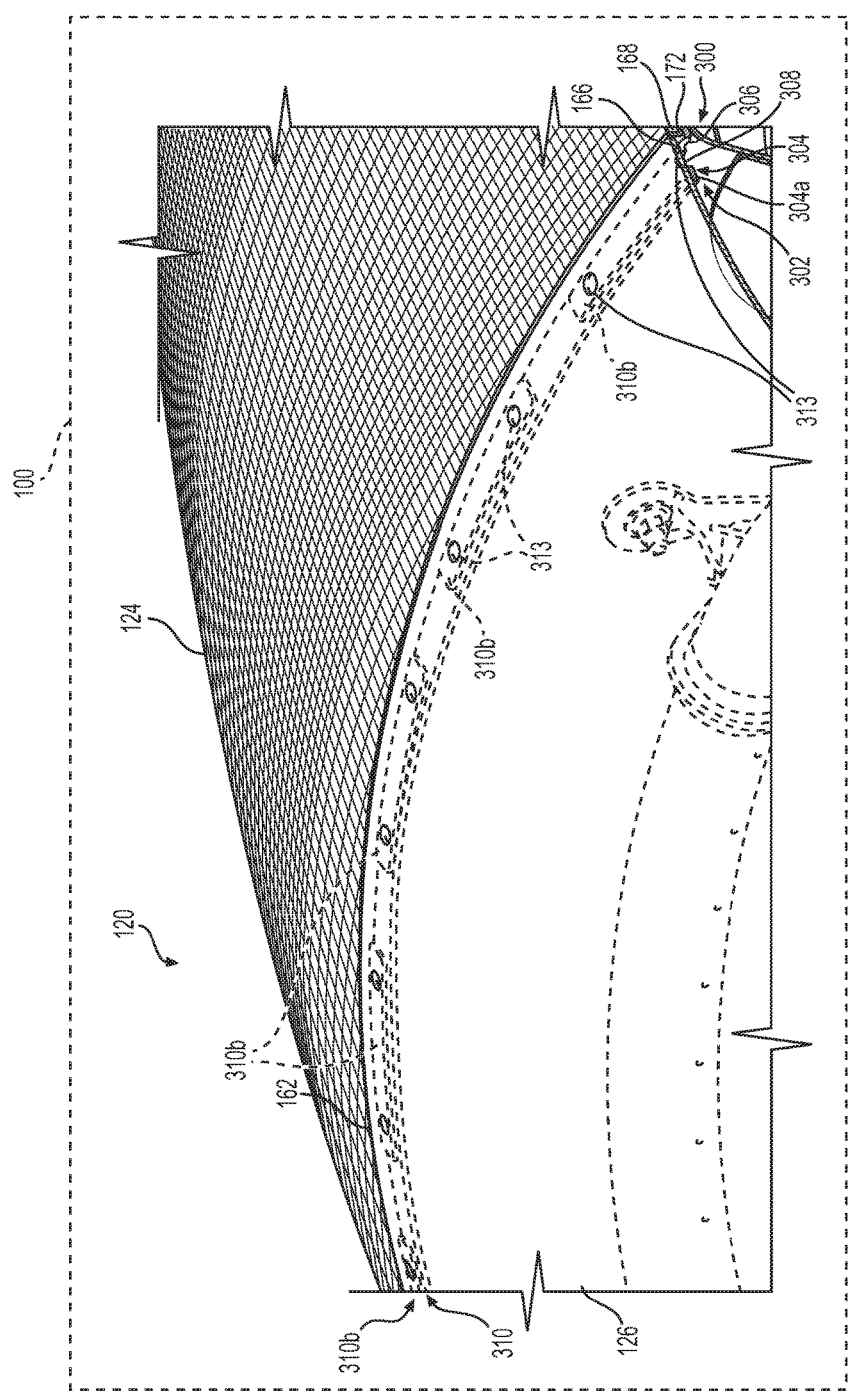
FIG. 10 is a detail view of a portion of an inlet cowl section of the engine assembly of FIG. 1, which includes an anti-icing exhaust system in accordance with one exemplary embodiment.

It should be noted that the plurality of spacers 310 are not limited to the plurality of washers 310a. Rather, with reference to FIG. 10, in this example, the plurality of spacers 310 comprise a plurality of shims 310b. In the example of FIG. 10, each of the plurality of shims 310b comprise two bores 313, which are coupled about two of the first plurality of bores 308 so as to be substantially coaxial with the respective bores of the first plurality of bores 308. It should be noted that while the shims 310b are illustrated herein as comprising two bores 313, the shims 310b can have any number of bores greater than two that are coaxial with respective ones of the plurality of bores 308. Each of the shims 310b are formed of a metal or metal alloy, and in one example, the bores 313 are defined at opposite ends of each shim 310b. Each of the plurality of shims 310b can be positioned between the inner skin 178 and the surface 304a of the first side 304 and coupled between the inner skin 178 and the first side 304 by the respective mechanical fastener, for example, bolt, screw, rivet etc., received through the first plurality of bores 308. Alternatively, each of the plurality of shims 310b can be integrally formed with the first end 304, via additive manufacturing, stamping, casting, etc. As a further alternative, each of the plurality of shims 310b can be coupled to the first end 304 via welding, adhesives, etc. In this example, each of the plurality of flow passages 312 are defined between adjacent ones of the plurality of shims 310b.

The intermediate body portion 306 is defined between the first end 304 and the second end 184. In this example, with reference to FIG. 9, the intermediate body portion 306 extends along an axis A3, which is oblique or transverse to an axis A2 of the second end 184. Thus, the first end 304 is generally offset from the second end 184 via the intermediate body portion 306 such that the support structure 302 has a generally Z-shape in cross-section. A width W5 of the intermediate body portion 306 defines a width of the gap 162. Stated another way, the intermediate body portion 306 spans the gap 162. In this example, the intermediate body portion 306 is solid and uninterrupted.

As the assembly of the anti-icing exhaust system 300 is substantially similar to the assembly of the anti-icing exhaust system 160, only the differences will be discussed in great detail herein. In this regard, the plurality of spacers 310 are positioned about a respective one of the first plurality of bores 308. With each of the first plurality of bores 308 and the plurality of spacers 310 coaxially aligned with each of the plurality of coupling bores 126a of the inlet lip 126, the one or more mechanical fasteners, such as bolts, screws, rivets, etc., can be inserted into the plurality of coupling bores 126a to pass through the plurality of spacers 310 and be coupled to the first plurality of bores 308, via nuts, deformation, threads, etc., to couple the first end 304 to the inlet lip 126. By coupling the first end 304 to the inlet lip 126 with the plurality of spacers 310 positioned therebetween, the plurality of flow passages 312 are defined between adjacent ones of the plurality of spacers 310 to enable fluid communication between the chamber 164 and the manifold 188. Thus, the plurality of flow passages 312 are in fluid communication with the chamber 164 to enable the anti-icing fluid F within the chamber 164 to flow from the chamber 164, through the plurality of flow passages 312, into the manifold 188 and to be exhausted in a substantially radial direction through the gap 162.

Figure 11:
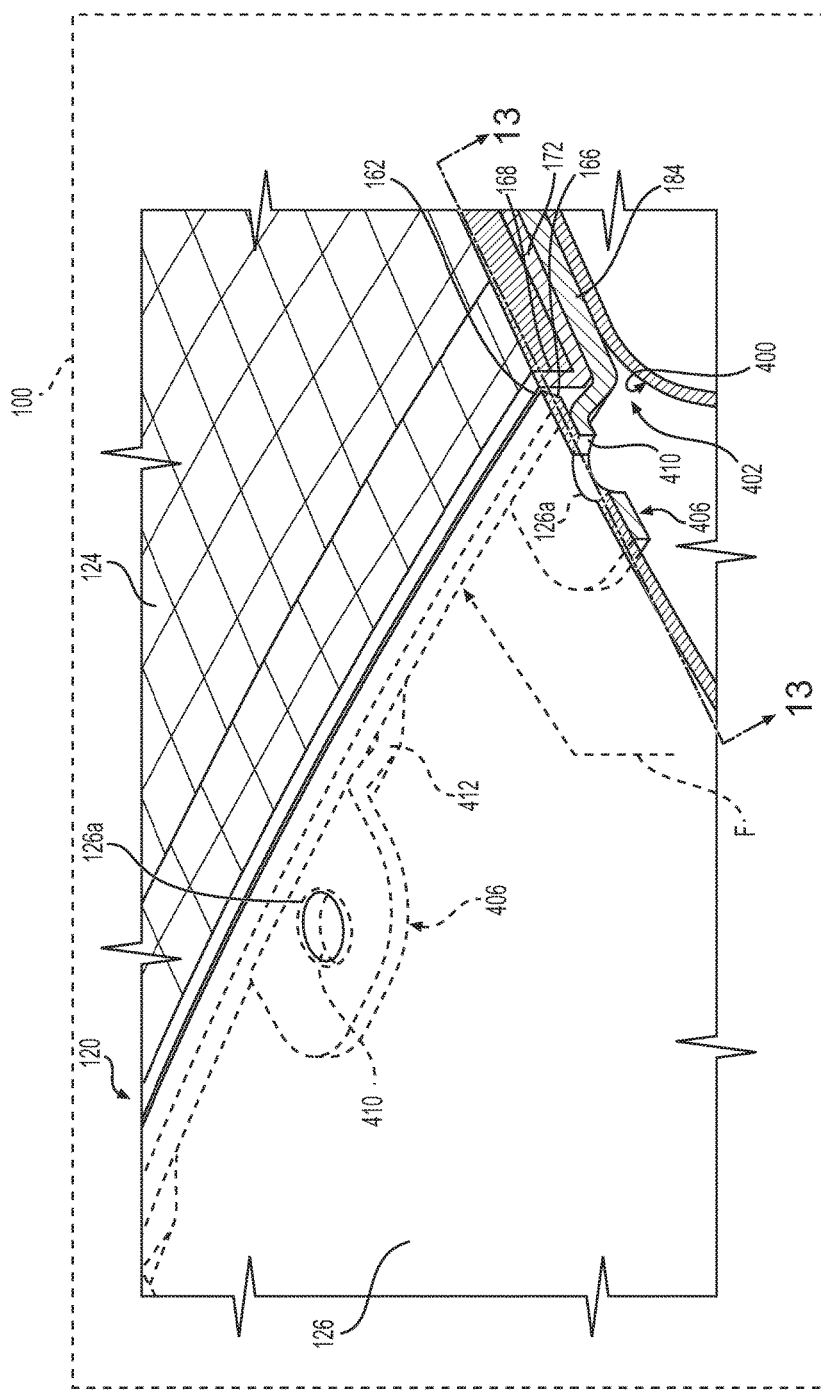
FIG. 11 is a detail view of a portion of an inlet cowl section of the engine assembly of FIG. 1, which includes an anti-icing exhaust system in accordance with one exemplary embodiment.

It will be understood that the anti-icing exhaust system 160 described with regard to FIGS. 1-7 is one exemplary embodiment for an anti-icing exhaust system for use with the inlet cowl section 120 of the engine assembly 100. In certain embodiments, with reference to FIG. 11, the inlet cowl section 120 of the engine assembly 100 includes an anti-icing exhaust system 400. As the anti-icing exhaust system 400 can be similar to the anti-icing exhaust system 160 described with regard to FIGS. 1-7, the same reference numerals will be used to denote the same or similar components. In this embodiment, the anti-icing exhaust system 400 includes a support structure 402 and the insulation strip 172.

Figure 12:
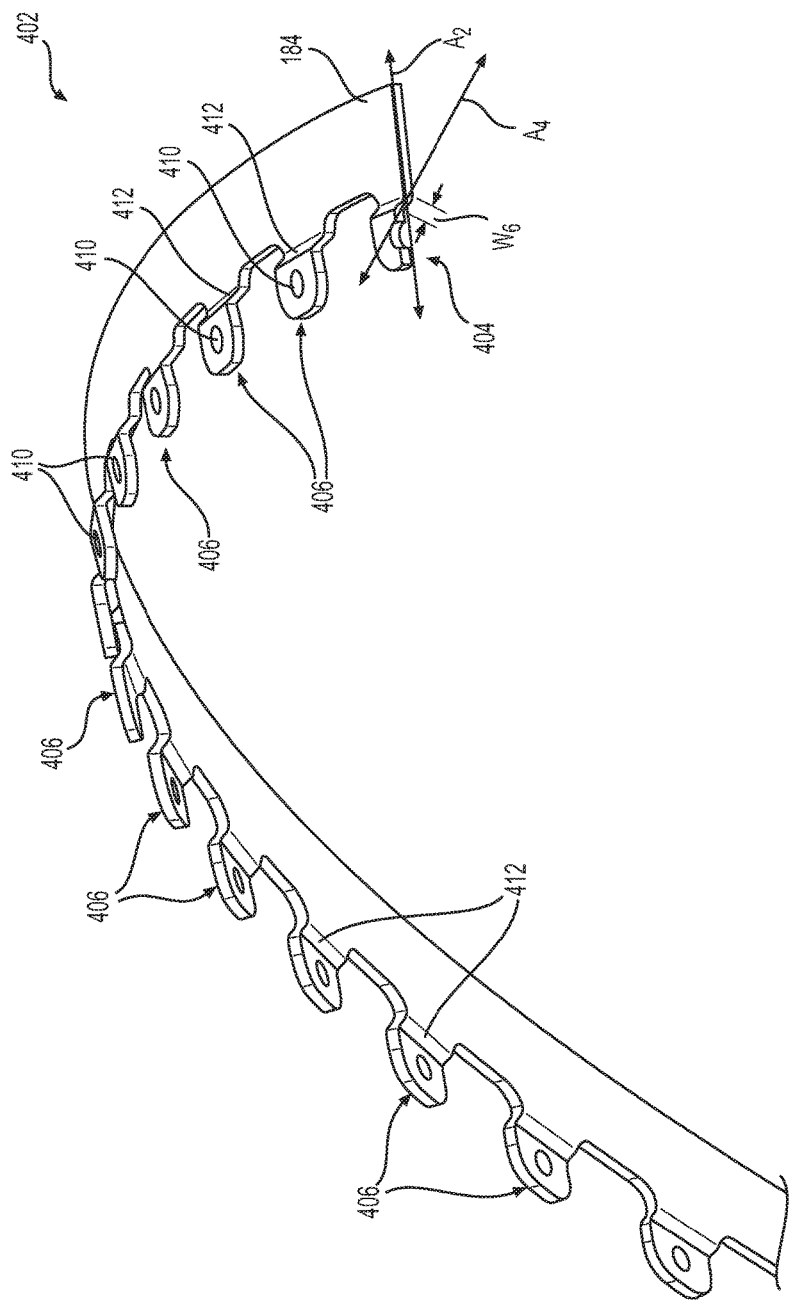
FIG. 12 is a detail perspective view of a portion of a support structure of the anti-icing exhaust system of FIG. 11.

The support structure 402 couples the first housing portion or the inlet lip 126 to the second housing portion or the outer barrel 124 such that the projection 166 of the inlet lip 126 is spaced apart from the leading edge 168 of the outer barrel 124 to define the gap 162 between the inlet lip 126 and the outer barrel 124. With reference to FIG. 12, the support structure 402 is annular so as to extend about an inner periphery of the inlet lip 126, and has a first end 404 and the second end 184. The first end 404 includes a plurality of mounting flanges 406 that are coupled to the second end 184. Generally, the support structure 402 is integrally formed of a metal or metal alloy, via stamping, casting, selective laser sintering, etc. It will be understood, however, that one or more of the first end 404, the second end 184 or the mounting flanges 406 may be separately formed and coupled to form the support structure 402 through welding, etc.

Figure 13:
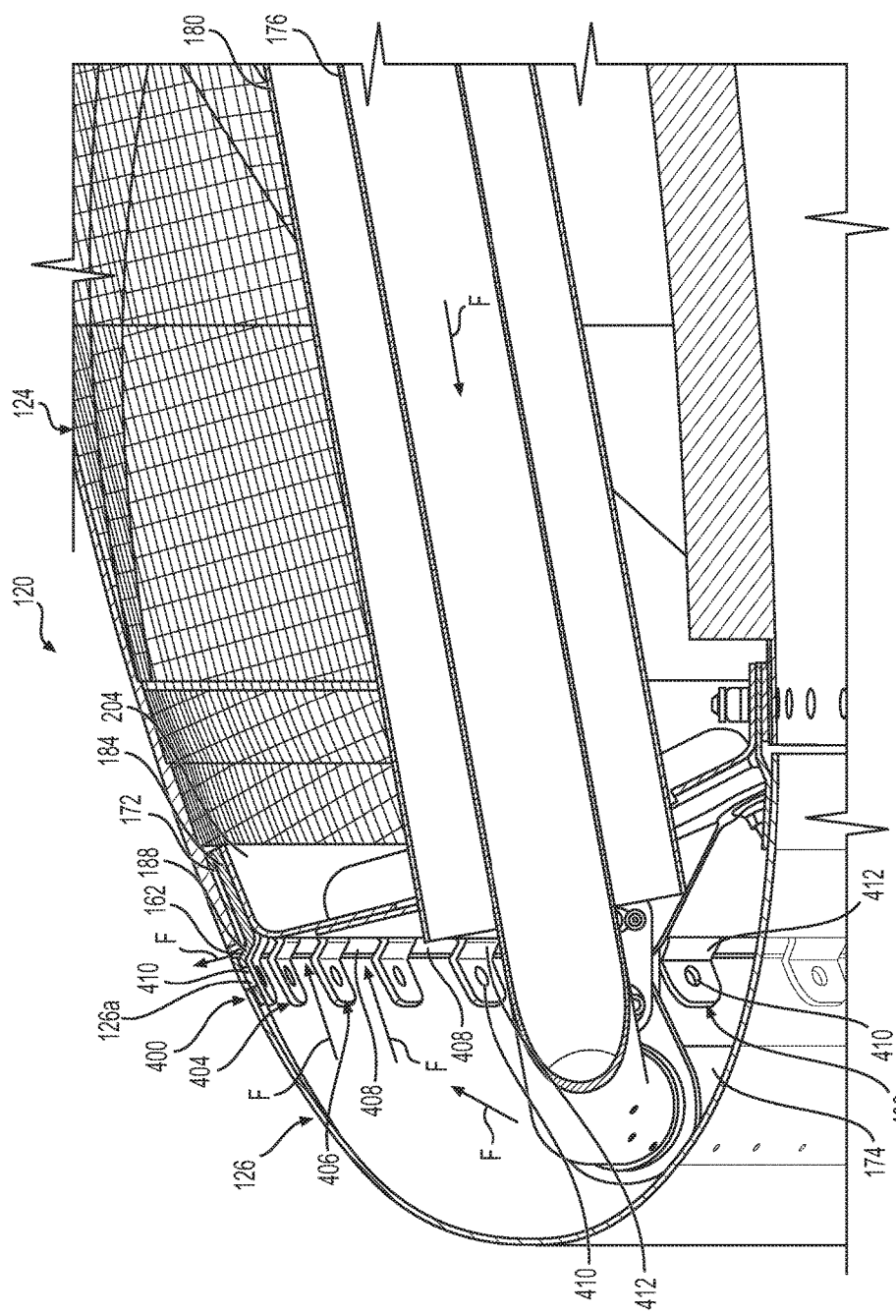
FIG. 13 is a cross-sectional view of the portion of the inlet cowl section including the anti-icing exhaust system of FIG. 11, taken along line 13-13 of FIG. 11.

In this example, with reference to FIG. 13, the plurality of mounting flanges 406 are spaced apart about the perimeter or circumference of the first end 404 such that a plurality of flow passages 408 are defined between adjacent ones of the plurality of mounting flanges 406. The plurality of flow passages 408 defined between adjacent ones of the plurality of mounting flanges 406 directs the anti-icing fluid F from the chamber 164 to the manifold 188, and from the manifold 188, the anti-icing fluid F is exhausted through the gap 162. In one example, about 15 to about 40 flow passages 408 are defined between the support structure 402 and the inlet lip 126, and are spaced substantially evenly about a perimeter or circumference of the support structure 402 and the gap 162. As each of the plurality of flow passages 408 are spaced substantially evenly about a perimeter or circumference of the support structure 402, and the gap 162 is defined to extend substantially continuously about the inlet cowl section 120, the plurality of flow passages 408 cooperate with the gap 162 to exhaust the anti-icing fluid from the plurality of flow passages 408 about a circumference of the inlet cowl section 120. Generally, the plurality of flow passages 408 cooperates with the gap 162 to exhaust the anti-icing fluid F along the outboard side of the outer barrel 124. It should be noted that while the plurality of flow passages 408 and the plurality of mounting flanges 406 are described and illustrated herein as being substantially evenly spaced about the circumference of the first end 404, the present disclosure is not so limited. In this regard, the plurality of mounting flanges 406, and thus, the plurality of flow passages 408 can be defined about the circumference of the first end 404 so as to be unevenly spaced about the circumference of the first end 404 to control an amount of the flow of the anti-icing fluid F into various portions of the manifold 188, and thus, to control the distribution of the exhaust of the anti-icing fluid F about the circumference of the inlet cowl section 120.

Each of the plurality of mounting flanges 406 includes a bore 410 and an intermediate portion 412. Each of the bores 410 are coaxially aligned with the plurality of coupling bores 126a of the inlet lip 126 to receive the plurality of mechanical fasteners, such as bolts, screws, rivets, etc. (not shown) to couple the inlet lip 126 to the first end 404 of the support structure 402.

The intermediate portion 412 couples each of the mounting flanges 406 to the second end 184, and cooperates to define the manifold 188 for the exhaust of the anti-icing fluid F through the gap 162. In this example, with reference to FIG. 12, the intermediate body portion 306 extends along an axis A4, which is oblique or transverse to an axis A2 of the second end 184. Thus, each of the mounting flanges 406 is generally offset from the second end 184 via the intermediate portion 412. A width W6 of the intermediate portion 412 defines a width of the gap 162. Stated another way, the intermediate portion 412 spans the gap 162.

As the assembly of the anti-icing exhaust system 400 is substantially similar to the assembly of the anti-icing exhaust system 160, only the differences will be discussed in great detail herein. In this regard, the mounting flanges 406 are positioned such that each of the bores 410 are coaxially aligned with a respective one of the plurality of coupling bores 126a. With each of the bores 308 coaxially aligned with each of the plurality of coupling bores 126a of the inlet lip 126, the one or more mechanical fasteners, such as bolts, screws, rivets, etc., can be inserted into the plurality of coupling bores 126a and be coupled to the bores 410, via nuts, deformation, threads, etc., to couple the first end 404 to the inlet lip 126. By coupling the first end 404 to the inlet lip 126 with the plurality of mounting flanges 406, the plurality of flow passages 408 are defined between adjacent ones of the plurality of mounting flanges 406 to enable fluid communication between the chamber 164 and the manifold 188. Thus, the plurality of flow passages 408 are in fluid communication with the chamber 164 to enable the anti-icing fluid F within the chamber 164 to flow from the chamber 164, through the plurality of flow passages 408, into the manifold 188 and to be exhausted in a substantially radial direction through the gap 162.

By exhausting the anti-icing fluid F through the gap 162, the anti-icing fluid F is directed outboard of the nacelle 106 of the gas turbine engine 104, in a substantially radial direction. Moreover, the anti-icing fluid F is exhausted through the gap 162 circumferentially about the nacelle 106 of the gas turbine engine 104, allowing for a substantially even distribution of the exhausted anti-icing fluid F about the nacelle 106 of the gas turbine engine 104. In addition, by exhausting the anti-icing fluid F through the gap 162, cost and complexity of the anti-icing exhaust system 160 is reduced, as the plurality of flow passages 192, 312, 408 are defined by the respective support structure 170, 302, 402. In addition, the anti-icing exhaust system 160 provides an aesthetically pleasing appearance, as the plurality of flow passages 192, 312, 408 are hidden from view from the exterior of the nacelle 106 of the gas turbine engine 104.

Figure 14:
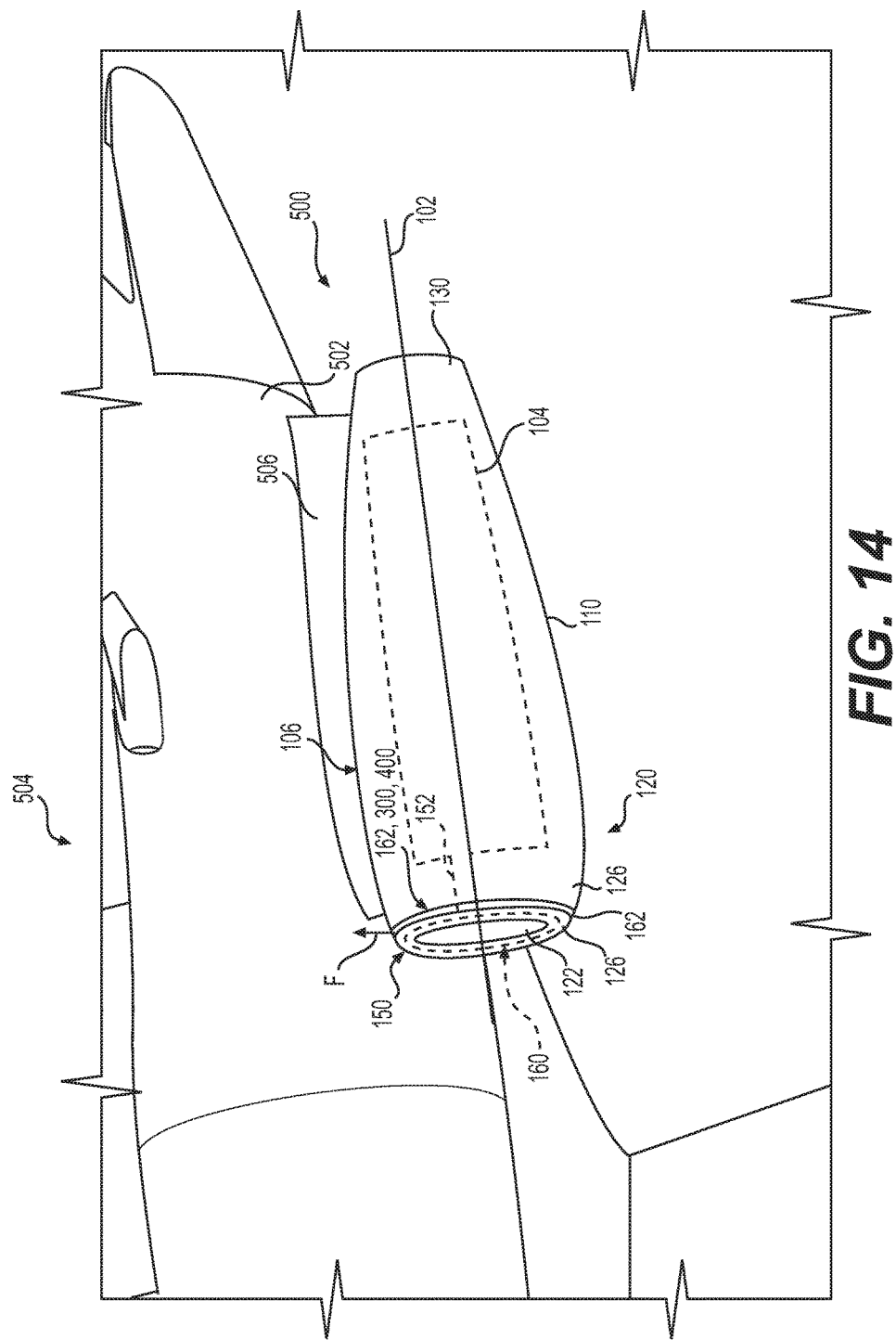
FIG. 14 is a partial schematic representation of another embodiment of an engine assembly, which includes one of the anti-icing exhaust systems in accordance with the various teachings of the present disclosure.

It will be understood that the engine assembly 100, including the anti-icing exhaust system 160, 300, 400 for use with the inlet cowl section 120, described with regard to FIGS. 1-13 is one exemplary embodiment for an engine assembly. In certain embodiments, with reference to FIG. 14, an engine assembly 500 is shown coupled to an empennage 502 of a fuselage 504 by a side pylon 506. In this embodiment, the engine assembly 500 includes one of the anti-icing exhaust systems 160, 300, 400 for use with the inlet cowl section 120. Thus, as illustrated in FIG. 14, the various teachings of the present disclosure are not limited to a wing mounted or overhead pylon mounted engine assembly 100 as illustrated in FIG. 1, but rather, the anti-icing exhaust system 160, 300, 400 can be used with the engine assembly 500 that is mounted to the empennage 502 by the side pylon 506.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An anti-icing exhaust system for an inlet of a gas turbine engine, comprising:
   a first housing portion associated with the inlet, the first housing portion at least partially defining a chamber to receive an anti-icing fluid from a source and including a projection;
   a second housing portion associated with the inlet, the second housing portion including a leading edge;
   a support structure that couples the first housing portion to the second housing portion such that the projection of the first housing portion is spaced apart from the leading edge of the second housing portion to define a gap between the first housing portion and the second housing portion, the gap in fluid communication with a manifold defined between the projection of the first housing portion and the support structure, and the support structure defines at least one flow passage in fluid communication with the chamber and the manifold to exhaust the anti-icing fluid from the chamber through the manifold and the gap; and
   an insulation strip having a first end and a second end, with the first end received in the gap and coupled to the leading edge and the second end coupled to the second housing portion.

2. The anti-icing exhaust system of claim 1, wherein the support structure includes a first end coupled to the first housing portion, a second end coupled to the second housing portion and an intermediate body portion, and the at least one flow passage is defined through the intermediate body portion.

3. The anti-icing exhaust system of claim 2, wherein the manifold is defined between the projection of the first housing portion, the intermediate body portion and the first end of the insulation strip.

4. The anti-icing exhaust system of claim 1, wherein the support structure includes a first end coupled to the first housing portion, a second end coupled to the second housing portion and an intermediate body portion that spans the gap, and the at least one flow passage is defined between adjacent ones of a plurality of spacers, the plurality of spacers coupled between the first end and the first housing portion.

5. The anti-icing exhaust system of claim 4, wherein the plurality of spacers comprise a plurality of washers coupled about each bore of a plurality of bores defined through the first end of the support structure, and the at least one flow passage is defined between adjacent ones of the plurality of washers.

6. The anti-icing exhaust system of claim 4, wherein the plurality of spacers comprise a plurality of shims coupled about at least two bores of a plurality of bores defined through the first end of the support structure and the at least one flow passage is defined between adjacent ones of the plurality of shims.

7. The anti-icing exhaust system of claim 1, wherein the support structure includes a first end having a plurality of mounting flanges, each one of the plurality of mounting flanges coupled to the first housing portion and a second end coupled to the second housing portion, and the at least one flow passage is defined between adjacent ones of the plurality of mounting flanges.

8. The anti-icing exhaust system of claim 1, wherein the first housing portion is an inlet lip, the second housing portion is an outer barrel of an inlet cowl section of a nacelle of the gas turbine engine and the insulation strip protects the leading edge of the second housing portion from the anti-icing fluid.

9. The anti-icing exhaust system of claim 1, wherein the projection of the first housing portion extends over the at least one flow passage such that the at least one flow passage is hidden from an exterior of a nacelle of the gas turbine engine by the projection.

10. The anti-icing exhaust system of claim 1, wherein the gap is defined to exhaust the anti-icing fluid in a radial direction into an environment surrounding the gas turbine engine.

11. The anti-icing exhaust system of claim 1, wherein the first housing portion and the second housing portion have an inboard side and an outboard side, and the at least one flow passage cooperates with the gap to exhaust the anti-icing fluid along the outboard side of the second housing portion.

12. The anti-icing exhaust system of claim 1, wherein the at least one flow passage comprises a plurality of flow passages defined about a perimeter of the support structure, and the gap extends continuously about the inlet to exhaust the anti-icing fluid from the plurality of flow passages about a circumference of the inlet.

13. An anti-icing exhaust system for an inlet of a gas turbine engine, comprising:
an inlet lip at least partially defining a chamber to receive an anti-icing fluid from a source associated with the gas turbine engine and including a projection;
an outer barrel having a leading edge;
a support structure that couples the inlet lip to the outer barrel such that the projection of the inlet lip is spaced apart from the leading edge of the outer barrel to define a gap between the inlet lip and the outer barrel, the gap in fluid communication with a manifold defined between the projection of the inlet lip and the support structure, and the support structure defines at least one flow passage in fluid communication with the chamber and the manifold to exhaust the anti-icing fluid from the chamber through the manifold and the gap in a radial direction, and the projection of the inlet lip extends over the at least one flow passage; and
an insulation strip having a first end and a second end, with the first end received in the gap and coupled to the leading edge to protect the leading edge from the anti-icing fluid and the second end coupled to the outer barrel.

14. The anti-icing exhaust system of claim 13, wherein the support structure includes a first end coupled to the inlet lip, a second end coupled to the outer barrel and an intermediate body portion, and the at least one flow passage is defined through the intermediate body portion.

15. The anti-icing exhaust system of claim 14, wherein the manifold is defined between the projection of the inlet lip, the intermediate body portion and the first end of the insulation strip.

16. The anti-icing exhaust system of claim 13, wherein the support structure includes a first end coupled to the inlet lip, a second end coupled to the outer barrel and an intermediate body portion that spans the gap, and the at least one flow passage is defined between adjacent ones of a plurality of spacers, the plurality of spacers coupled between the first end and the inlet lip.

17. The anti-icing exhaust system of claim 16, wherein the plurality of spacers comprise a plurality of washers coupled about each bore of a plurality of bores defined through the first end of the support structure, and the at least one flow passage is defined between adjacent ones of the plurality of washers.

18. The anti-icing exhaust system of claim 16, wherein the plurality of spacers comprise a plurality of shims coupled about at least two bores of a plurality of bores defined through the first end of the support structure and the at least one flow passage is defined between adjacent ones of the plurality of shims.

19. The anti-icing exhaust system of claim 13, wherein the support structure includes a first end having a plurality of mounting flanges, each one of the plurality of mounting flanges coupled to the inlet lip and a second end coupled to the outer barrel, and the at least one flow passage is defined between adjacent ones of the plurality of mounting flanges.

20. An anti-icing exhaust system for an inlet of a gas turbine engine, comprising:
an inlet lip at least partially defining a chamber to receive an anti-icing fluid from a source associated with the gas turbine engine and including a projection;
an outer barrel having a leading edge;
a support structure having a first end coupled to the inlet lip, a second end coupled to the outer barrel and an intermediate body portion that spaces the projection of the inlet lip apart from the leading edge of the outer barrel to define a gap between the inlet lip and the outer barrel, the gap in fluid communication with a manifold defined between the projection of the inlet lip and the support structure, and the intermediate body portion defines a plurality of flow passages in fluid communication with the chamber and the manifold to exhaust the anti-icing fluid from the chamber through the manifold and the gap in a radial direction; and
an insulation strip having a first end and a second end, with the first end received in the gap and coupled to the leading edge to protect the leading edge from the anti-icing fluid and the second end coupled to the outer barrel.

* * * * *